United States Patent [19]
Hamada et al.

[11] Patent Number: 5,510,203
[45] Date of Patent: Apr. 23, 1996

[54] CELL AND MODULE BATTERY OF SEALED ALKALINE STORAGE BATTERY

[75] Inventors: Shinji Hamada; Kanji Takata, both of Neyagawa; Akinori Yokota, Moriguchi; Hiromu Matsuda, Hyogo; Munehisa Ikoma, Nara, all of Japan

[73] Assignee: Matsushita Electric Industrial Co., Ltd., Osaka, Japan

[21] Appl. No.: 290,167

[22] Filed: Aug. 15, 1994

[30] Foreign Application Priority Data

Feb. 23, 1994 [JP] Japan ..................... 6-025460

[51] Int. Cl.⁶ ..................... H01M 2/02; H01M 2/12
[52] U.S. Cl. ..................... 429/53; 429/148; 429/151; 429/156; 429/163
[58] Field of Search ..................... 429/53, 148, 151, 429/153, 156, 157, 163

[56] References Cited

U.S. PATENT DOCUMENTS

| | | | |
|---|---|---|---|
| 729,550 | 6/1903 | Condict | 429/148 |
| 2,385,127 | 9/1945 | Carlile | 429/148 X |
| 3,463,672 | 8/1969 | Schmidt | 429/151 X |
| 3,745,048 | 7/1973 | Dinkler et al. | |
| 3,767,468 | 10/1973 | Schusler | 136/166 |
| 4,567,118 | 1/1986 | Connelly | 429/53 |
| 5,171,647 | 12/1992 | Dean et al. | 429/53 X |
| 5,288,565 | 2/1994 | Gruenstern | 429/153 |

FOREIGN PATENT DOCUMENTS

| | | |
|---|---|---|
| 243356 | 12/1962 | Australia ............ 429/148 |
| 0065349 | 4/1982 | European Pat. Off. . |
| 0136474 | 8/1984 | European Pat. Off. . |
| 0533317A3 | 6/1992 | European Pat. Off. . |
| 3-291867 | 12/1991 | Japan . |
| 5-343105 | 12/1993 | Japan . |
| 39558 | 6/1962 | Luxembourg . |
| 2074134 | 4/1980 | United Kingdom . |

OTHER PUBLICATIONS

James D. Dunlop, et al., "Hydrogen/Nickel Oxide Battery: Individual Cells in a Common Pressure Vessel (ICPV)", *Extended Abstracts*, vol. 86, No. 2, 1986 Princeton, New Jersey.

*Primary Examiner*—Stephen Kalafut
*Attorney, Agent, or Firm*—Panitch Schwarze Jacobs & Nadel

[57] ABSTRACT

A module battery of sealed alkaline storage battery comprises a plurality of cells stacked in one direction each of which comprises a battery casing of a synthetic resin, an electrolyte and an electrode group accommodated in the battery casing and a lid with a safety bent sealingly fitted to the opening of the battery casing; wherein the cells are bound in the direction of stacking by binding members for coupling the end plates at the ends of the stacked battery assembly to each other; the cells are butted to each other by a plurality of parallel ribs formed on the outer surface of the battery casing along the direction of stacking thereby to form spaces for allowing air flow between the cells, a thickness of the side wall of the battery casing along the direction of stacking is 1 to 3 mm, a rib height 1 to 2 mm, a rib interval 10 to 15 mm, and a rib width 3 to 10 mm.

23 Claims, 4 Drawing Sheets

CELL AND MODULE BATTERY OF SEALED ALKALINE STORAGE BATTERY

BACKGROUND OF THE INVENTION

1. Field of the Invention

The present invention relates to a module battery of a sealed alkaline storage battery of a comparatively large capacity, a cell and a battery casing for configuring the battery.

2. Description of the Related Art

Sealed alkaline storage batteries, which typically include nickel-cadmium storage batteries and nickel-metal hydride storage batteries, are widely used as power supply sources for portable equipments such as video cassette recorders, lap-top type computers and portable telephones owing to their high energy density and reliability. These batteries have a metal casing of cylindrical or rectangular shape, a capacity of about 0.5 Ah to 3 Ah, and are configured of cells to make up a small-sized sealed alkaline storage battery. In practical applications, several to several tens of cells are generally contained in a synthetic resin casing or tube.

These small-sized sealed alkaline storage batteries have a battery capacity as small as about 0.5 Ah to 3 Ah, and therefore generate only a small amount of heat per cell at the time of charging or discharging. As a result, in the case where they are used in a resin casing or tube, an appropriate balance or equilibrium is maintained between heat generation and heat discharge. Therefore no significant problem has been posed with regard to a temperature increase of the battery. Also, although the electrodes of the alkaline storage battery expand as a result of repetitive charging and discharging, no serious problem of casing deformation due to electrode expansion has been posed in view of the fact that the casing is made of a cylindrical metal. This is also true with the rectangular type of battery, for which no special configuration has been necessary for the casing.

Nevertheless, there is an ever-increasing demand for medium and large-sized batteries (the medium-sized battery is defined as those from 10 Ah to 100 Ah in capacity, and the large-sized one as those 100 Ah or more in capacity. The number of cells used is several to several hundreds for either type) high in energy density as a mobile power supply for various devices including home-use appliances and electric vehicles. The open-type nickel-cadmium storage battery and the lead-acid storage battery are used for energy storage and as a power source in case of power outage. In spite of these advantages, these batteries have the disadvantage of the need of troublesome maintenance such as for filling an electrolyte solution during the lifetime. In view of this, there has been a demand for a battery suitable for a mobile power source for various applications including home-use appliances and electric vehicles, which is free of maintenance, by having a sealed configuration.

As explained above, in the case where an alkaline storage battery is used as a mobile power supply for various devices including home-use appliances and electric vehicles, the battery is required to be sealed and increased in size to medium or large scale at the same time. More specifically, it is necessary to connect a multiplicity of the cells in series while sealing them in order to increase the electric capacity and voltage of a unit.

The battery generates Joule's heat and reaction heat due to electrode reaction at charging and discharging operations. The cells, with an increased electric capacity and sealed configuration, increase in the amount of heat accumulation, with the result that heat dissipation out of the battery is retarded and the generated heat is accumulated within the battery. Consequently, the internal temperature of such a battery rises by a degree more than that of a smaller battery. A module battery including a series of cells having such a large capacity or a pack battery including a series of module batteries is configured of several tens to several hundreds of cells arranged contiguously to each other.

In order to obviate the above-mentioned problems, a heat dissipation device for the storage battery system has been suggested by Japanese Laid-Open Patent Publication No. Hei 3-291867 configured of a multiplicity of cells generating heat at the time of charging, in which each cell includes positive electrodes, negative electrodes and an electrolyte, and in which a space for allowing air flow is formed between the cells with a ratio of space width to cell width set to a range of 0.1 to 1.0.

The above-mentioned configuration of forming a space for air flow between cells with the ratio between the space width and cell width set to 0.1 to 1.0 still poses the following problems:

(1) Because of the fact that the electrode group expands with repetitions of charging and discharging and an increased internal pressure of the battery, the casing expands thereby making it difficult to maintain a constant space width for allowing air flow. In order to maintain a constant air space between cells, the casing strength must be increased. The increase of the casing strength requires an increased thickness at the expense of an increased casing weight or volume, battery weight or volume and hence a decrease of energy density.

(2) In the case where the casing expands and is deformed due to an increased internal pressure of the battery, there occurs a space between the electrode group and the casing. With the space formed between the electrode group and the casing, the rate of heat transmitted to the casing against the heat generated by the electrode group is extremely reduced. As a result, it is desirable to keep the casing in contact with the electrode group.

(3) For applications to a mobile power supply, a configuration of a module battery having about 5 to 40 cells or a pack battery which includes two or more module batteries and is equivalent to about 10 to 300 cells is required to reduce the variations in battery performance such as battery capacity and improve the battery performance such as energy density and the mechanical strength for preventing displacement due to vibrations.

An object of the present invention is to solve the above-mentioned problems and provide a battery in which the reduction in energy density and deformation or breakage of the casing of the module or pack battery are prevented and the mechanical strength of the module or pack battery against vibrations is improved.

Another object of the present invention is to provide a battery which is free of deformation or breakage of the casing or displacement of the unit or pack battery after repetitive charging and discharging or long time operation, and which can efficiently dissipate the heat generated in the battery at the time of charging and discharging out of the battery system, thereby leading to a superior constant battery performance.

SUMMARY OF THE INVENTION

The present invention provides a battery casing made of a synthetic resin for configuring a module battery including a plurality of cells accumulated in one direction, wherein the battery casing has a plurality of parallel ribs in contact with an adjacent battery casing on the external surface of side walls along the direction of cell stacking. A thickness of the side walls of the casing along the stacking direction is from 1 mm to 3 mm, a height of the rib from 1 mm to 2 mm, an interval of the rib from 10 mm to 15 mm, and a width of the rib from 3 mm to 10 mm.

A cell of the sealed alkaline storage battery in accordance with the present invention contains an alkaline electrolyte and an electrode group comprising positive electrode plates and negative electrode plates with separators provided between adjacent plates within the battery casing and is sealed by a lid with a safety vent.

Further, a module battery of sealed alkaline storage battery in accordance with the present invention includes a plurality of the above-mentioned cells stacked in one direction, which are bound in the stacking direction by binding members coupling end plates provided on both ends in the stacking direction to each other, the cells being arranged in butted relation with each other by a plurality of parallel ribs formed on the outer surface of the battery casing in the stacking direction thereby to form spaces allowing air flow between the cells.

In a preferred embodiment of the present invention, a thickness of side walls of the casing lacking ribs described above is from 3 mm to 5 mm and a thickness of the lid from 3 mm to 5 mm.

Further, in another preferred embodiment of the present invention, the constituent members of the battery casing are a synthetic resin having a bending elastic modulus of 14,000 to 28,000 kg/cm$^2$.

In still another preferred embodiment, at least one of the battery casing ribs has a protrusion on its surface and another one has a recess on its surface, for defining relative positions of the cells.

In a further preferred embodiment, the ribs are formed continuously in longitudinal or lateral direction of the battery casing.

Further, a recess for positioning the binding member is preferably formed on the side wall of the battery casing. Also, sheet-shaped positive and negative electrodes of the electrode group are accumulated along the stacking direction of the cells through a separator, and at least a part of the electrode group is preferably kept in contact with the inner surface of the battery casing.

The operating pressure of the safety vent is preferably from 2 kg/cm$^2$ to 8 kg/cm$^2$.

According to a preferred embodiment of the present invention, the positive electrode plate is a nickel electrode having nickel hydroxide as an active material, and the negative electrode plate a hydrogen storage alloy electrode made of, as a main component, a hydrogen storage alloy which electrochemically absorbs and desorbs hydrogen.

While novel features of the invention are set forth in the precedings, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

A preferred configuration of the sealed alkaline storage battery, cells and a battery casing making up the battery in accordance with the present invention will be explained with reference to the accompanying drawings.

Figure 1:
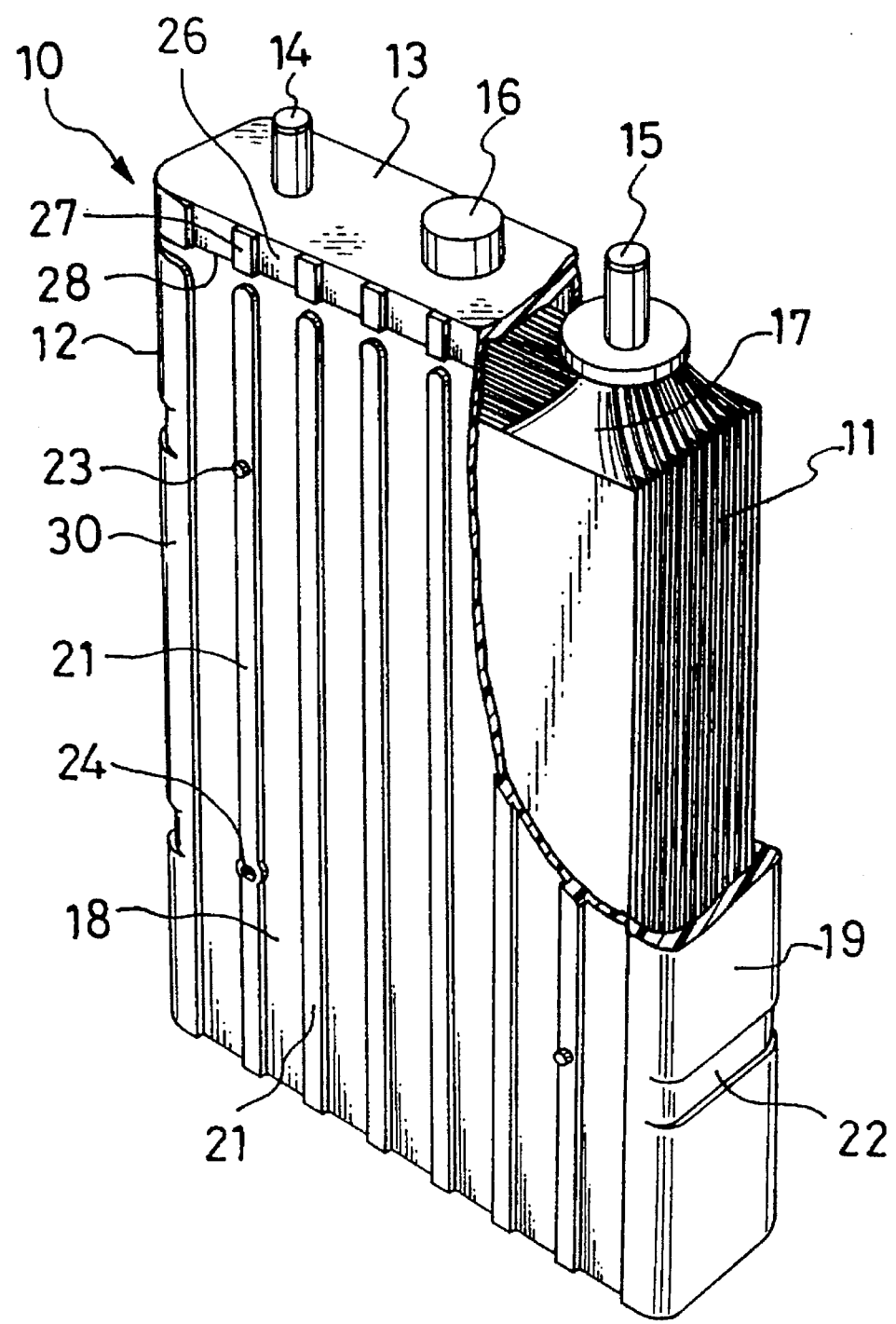
FIG. 1 is a partially-cutaway perspective view of a cell of a sealed alkaline storage battery in an embodiment of the present invention.
Figure 2:
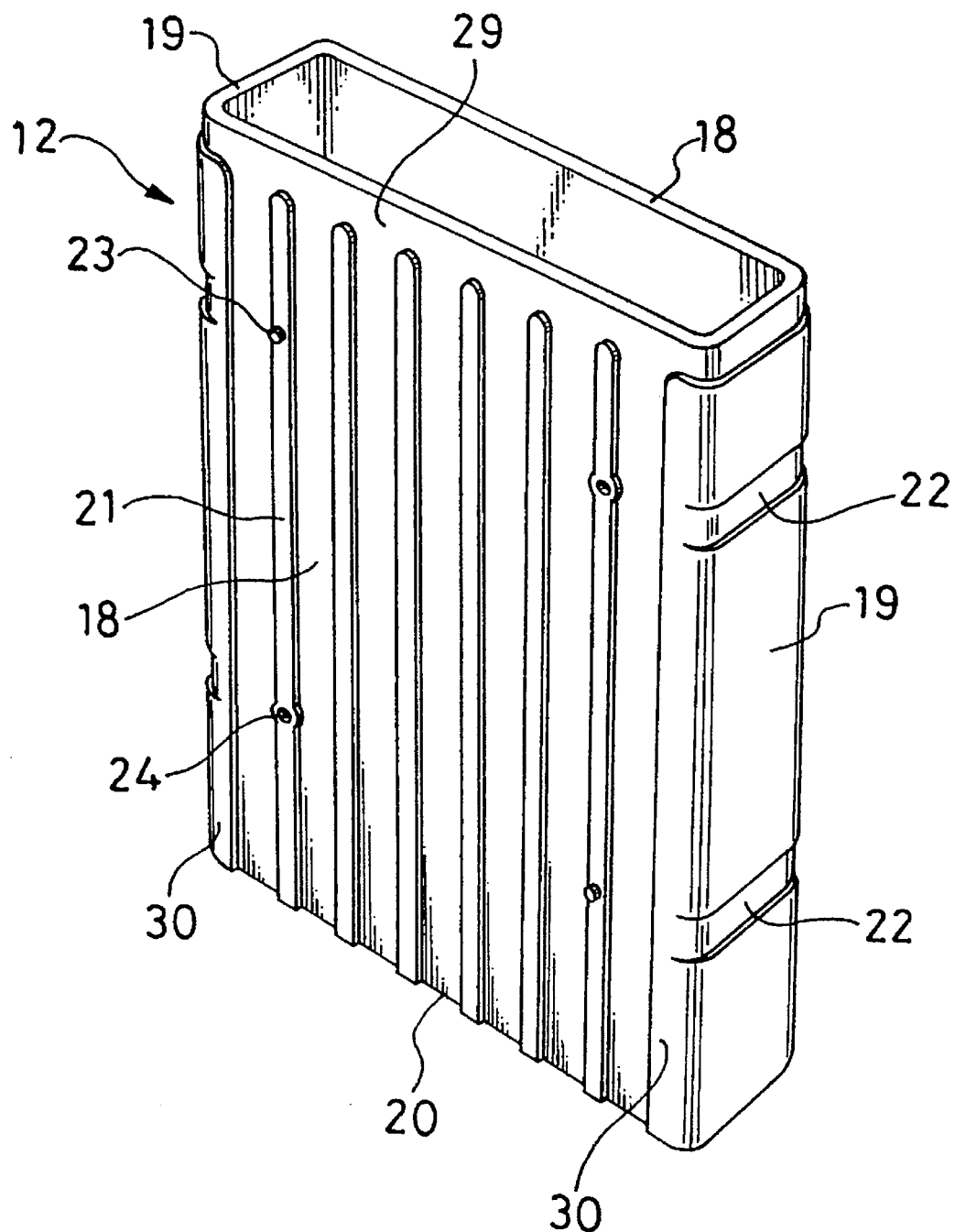
FIG. 2 is an upward perspective view showing a battery casing in the embodiment of the present invention.
Figure 3:
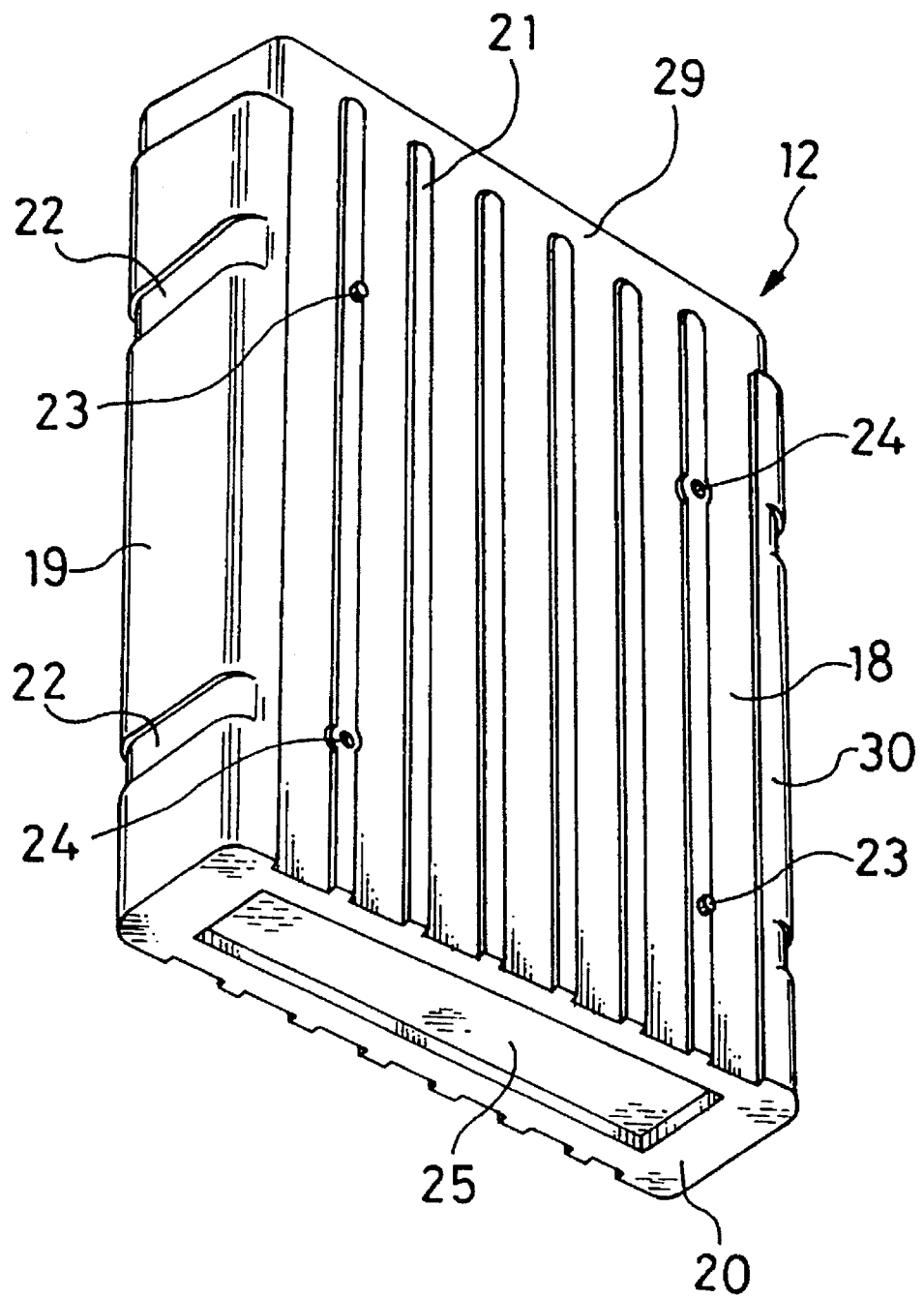
FIG. 3 is a downward perspective view of the battery casing in the embodiment of the present invention.

As shown in FIGS. 1, 2 and 3, a cell 10 includes a rectangular battery casing 12 of a synthetic resin such as polypropylene containing an electrode group 11 and an electrolyte. The electrode group comprises positive and negative electrode plates and separators which are piled one on another. A lid 13 of the same synthetic resin material as that of the casing 12 is thermally welded to the upper opening of the battery casing 12. The lid 13 comprises fixed thereto a positive terminal 14 and a negative terminal 15 made of nickel-plated iron and a safety vent 16. The negative terminal 15 has a displaced portion at the lower end thereof (not shown) connected by welding lead members 17 of the negative electrode plates. The upper portion of the negative terminal 15 is mounted on the lid 13 in both liquid and gas tight fashion. The lower end of the positive electrode terminal 14 is connected to lead members of the positive electrode plates not shown.

Referring to FIGS. 1–3, the battery casing 12 includes wide side walls 18, 18 located in the stacking direction of the cells, narrow side walls 19, 19 and a bottom wall 20. A plurality of ribs 21 for placing the cells in butted relation with each other are arranged in parallel longitudinally to each other in a spaced relationship on the outer surface of the side wall 18. On the other hand, two recesses 22 for positioning the binding members which will be described later are arranged on the outer surface of the side wall 19. The end ribs have a protrusion 23 and a recess 24 in reversed positions for positioning the ribs in butted relation. These protrusion and recess are called positioning members. Also, the outer surface of the bottom wall 20 of the battery casing has a recess 25 at the central portion thereof as shown in FIG. 3.

Referring again to FIG. 1, the lid 13 has a plurality of ribs 27 similar to the ribs 21 of the battery casing 12 on the outer surface of the wider side wall 26.

The weld portion between the lid 13 and the casing 12 is designated by numeral 28, and the portion of the welding margin externally protruded by welding is removed by grinding.

The upper portion of the casing 12 free of the ribs 21 designated by numeral 29 (as shown in FIGS. 2 and 3) is a welding margin for welding with the lid 13.

The side wall 19 of the casing 12 is thicker than the side wall 18 and continuously formed with the rib 30 on the outer side of the rib 21. The lid 13 has a similar configuration.

It is preferable that cell 10 has a height of from 5 cm to 20 cm, a width of from 5 cm to 20 cm and a thickness in the stacking direction of from 1.5 cm to 5 cm.

Figure 4:
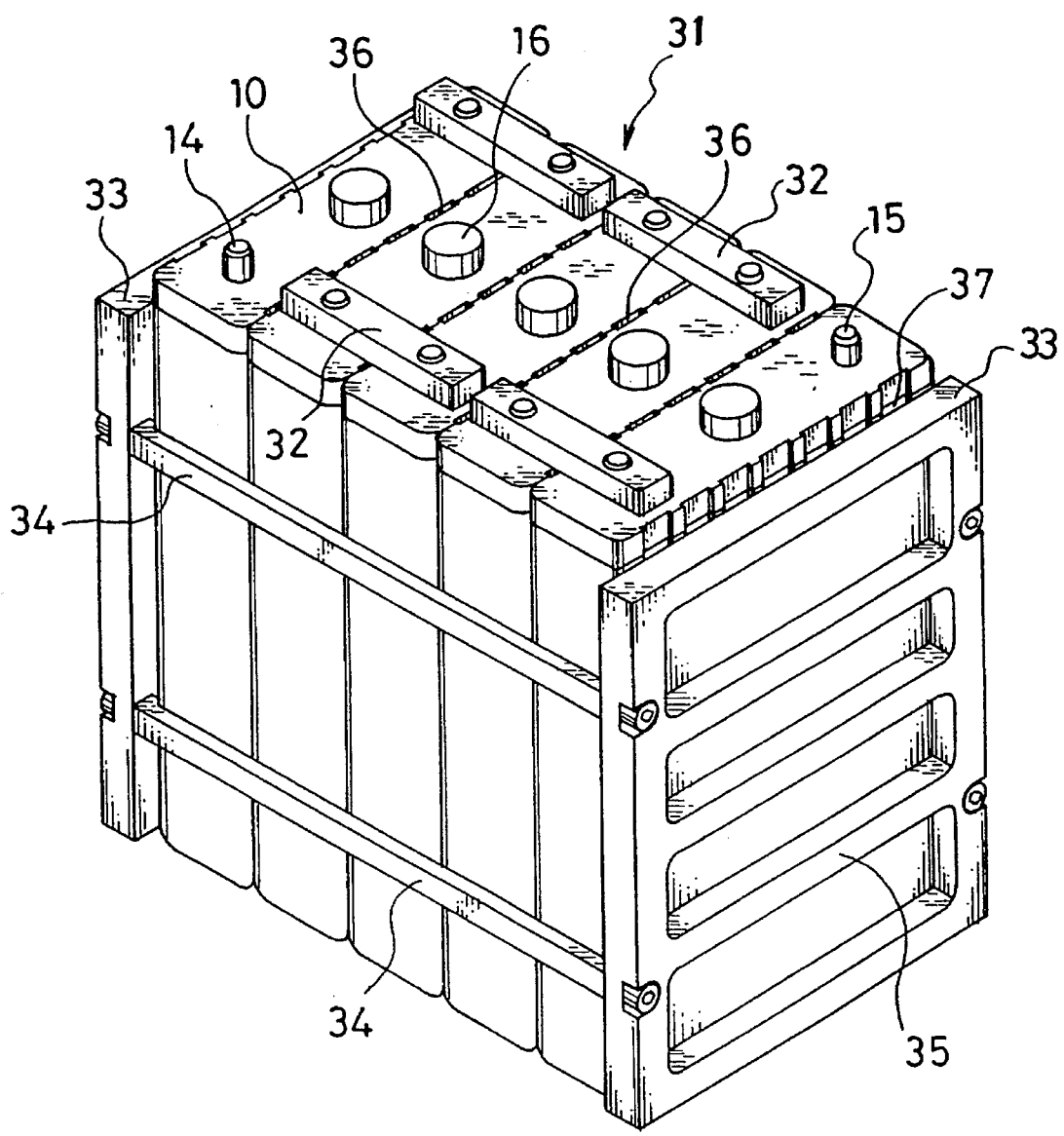
FIG. 4 is a perspective view showing a module battery in the embodiment of the present invention.

FIG. 4 shows a module battery 31 having five cells 10 electrically connected in series. Contiguous cells have the ribs 21, 30 of the casing 12 butted with each other, and the protrusion 23 formed on the rib 21 of one of the cells is fitted in the recess 24 of the rib 21 of the other cell for securing relative positions. Further, the positive and negative terminals of adjacent cells are connected by means of connecting conductors 32.

The stacked assembly of the five cells connected in series in this manner has aluminum end plates 33, 33 kept in contact with the ends thereof. These plates are coupled by four prismatic binding members 34 thereby tightly binding the cells to each other not to be separated by an increased internal pressure of the cells or expansion of the electrodes. Each end plate 33 has reinforcing ribs 35. The dimension of the end plate 33 and the binding member 34 is determined taking account of the expansion force of the electrode group, the number of stacked cells and the internal pressure of the battery. In the embodiments described below, the thickness of the end plate 33 is 3 mm, the height of the ribs 10 mm, and the binding member is a 8×8 mm prism.

In the module battery configured as mentioned above, spaces 36 are formed between the ribs 21 and 30. Spaces 37 corresponding to the height of the ribs 21 are formed also between the end cell and the end plate 33.

In the above-mentioned cases, instead of the prismatic structure, the cylindrical or band structure may be used alternatively for the binding member.

Also, the ribs 21 which are continuously formed along the longitudinal direction of the battery casing may alternatively be divided into several sections. The advantage of the continuous structure, however, is a fixed direction of air flow for an improved heat dissipation.

According to the module battery having the above-mentioned configuration, even when the electrode group expands or the internal pressure of the battery rises, the cells are securely held by the end plates coupled by the binding members, and spaces for cooling air are secured by ribs in butted relation with each other. As a result, heat dissipation is accomplished properly.

Also, by setting the thickness of the lid and the other side wall of the battery casing or selecting a proper material with the bending elastic modulus of the casing constituent members of a proper value, the cells can stand the binding force by the end plates and the binding members and the expansion of the electrode group, while at the same time accomplishing effective heat dissipation from the side walls of the casing.

Further, the fittings between the protrusions and recesses formed on the rib surfaces facilitate relative positioning of the cells at the time of stacking thereof.

Furthermore, since the ribs are formed continuously in longitudinal or lateral direction, the flow direction of the cooling air is fixed thereby improving the heat dissipation efficiency.

In addition, the binding members are easily positioned by the recesses formed in the side walls of the battery casing. Also, displacement due to vibrations is eliminated in cooperation with the appropriate positioning of protrusions and recesses of the ribs thereby making up a strong module battery.

In the case where the electrode plates of the electrode group are laminated in the same direction as the cell stacking direction, with at least a part of the electrode group kept in contact with the inner surface of the battery casing, the expansion of the cells is prevented by the binding force of the end plates against the expansion of the electrode group. At the same time, efficient heat dissipation is secured from the electrode group through the battery casing.

According to the present invention, the cells making up the module battery are strongly bound to each other by securing spaces formed by ribs in butted relation. As a result, the expansion or deformation of the battery casing is prevented and the heat generated within the battery can be dissipated efficiently out of the battery. As a consequence, variations in discharge capacity between cells or the deterioration of cycle life is suppressed.

Also, the displacement between the cells is eliminated by fitting the protrusions and recesses of the ribs to each other, and recesses for positioning the binding members are formed in the side walls of the battery casing, thereby realizing a module battery free of displacement against vibrations.

As described above, according to the present invention, there is provided a medium- or large-sized sealed alkaline storage battery high in reliability.

EXAMPLE 1

An electrode mixture containing nickel hydroxide powder as a main component was filled in a foamed nickel porous substrate. This substrate was then pressed by a pressure roller and cut to a predetermined size, thereby to prepare a nickel positive electrode plate having a capacity of 10 Ah per one plate. Also, a powder of a hydrogen storage alloy whose composition was represented by the formula: $MmNi_{3.6}Co_{0.7}Mn_{0.4}Al_{0.4}$ (Mm: misch metal) was applied to a punched metal together with a binder, pressed by a pressure roller and cut to a predetermined size, thereby preparing a hydrogen storage alloy negative electrode having a capacity of 13 Ah per one plate.

Each of these positive and negative electrode plates was wrapped in a bag-shaped separator. Ten positive electrode plates and eleven negative electrode plates were alternately piled to configure an electrode group. The positive and negative electrodes were connected to respective terminals with lead members and inserted into the battery casing described above. Then 180 $cm^3$ of an alkaline electrolyte was injected therein to form a cell as described above.

The battery casing 12 contained side walls 18 having a thickness of 2 mm, ribs 21 and 30 having a height of 1.5 mm, the ribs 21 having a width of 5 mm and a width of 12 mm between the ribs, and side walls 19 and a bottom wall 20 each having a thickness of 4 mm. Also, a thickness of the lid 13 was 4 mm.

The cell of the above-mentioned configuration was charged for 15 hours at a current of 10 A and discharged at a current of 20 A until the cell voltage decreased to 1.0 V as an initial charging and discharging operation. As a result, the electrodes expanded and came into close contact with the side walls of the casing 12. A capacity of this cell was restricted by the positive electrode, and this cell had a battery capacity of 100 Ah. Five such cells were used to configure a module battery as shown in FIG. 4.

Cell 10 was 17 cm in height, 12 cm in width and 3.5 cm in thickness in the stacking direction.

Comparative Example 1

A module battery was prepared, in which no ribs were formed on the outer surface of the lid and the battery casing and five cells were fixed at 3-mm intervals.

Comparative Example 2

A module battery was prepared, using neither the end plate nor the binding member, with the cells connected to each other simply by conductors connecting terminals thereof.

The module batteries configured as shown in Example 1, Comparative Examples 1 and 2 were subjected to a discharge capacity test and a cycle life test. The discharge capacity test was conducted at a current of 20 A until the battery voltage decreased to 5 V after the module battery involved was charged for 12 hours at a current of 10 A and allowed to stand for one hour. The discharge capacity of the module battery was calculated with reference to the discharge time before the battery voltage has decreased to 5 V. Also, calculations for the cells were made with reference to the discharge time before the cell voltage has decreased to 1 V. At the time of charging, the spaces between the cells, sides of the module battery and the surfaces of the end plates were exposed to air supplied from under the battery by means of a fan. The fan capacity was regulated so that an average velocity of air passing through the spaces 36 was 1.0 m/s. The environmental temperature was 20° C. The test result is shown in Table 1. The cycle life test was conducted by repeating the same conditions as the charging and discharging operation under which the discharge capacity was investigated. The test result is shown in Table 2.

TABLE 1

|  | Example 1 | Comparative Example 1 | Comparative Example 2 |
|---|---|---|---|
| Module battery | 98 Ah | 82 Ah | 77 Ah |
| Cell 1 | 98 Ah | 84 Ah | 81 Ah |
|  | 35° C. | 42° C. | 50° C. |
| Cell 2 | 98 Ah | 83 Ah | 78 Ah |
|  | 35° C. | 44° C. | 52° C. |
| Cell 3 | 98 Ah | 80 Ah | 76 Ah |
|  | 35° C. | 48° C. | 54° C. |
| Cell 4 | 98 Ah | 82 Ah | 77 Ah |
|  | 35° C. | 46° C. | 53° C. |
| Cell 5 | 98 Ah | 85 Ah | 80 Ah |
|  | 35° C. | 44° C. | 51° C. |

TABLE 2

|  | Example 1 | Comparative Example 1 | Comparative Example 2 |
|---|---|---|---|
| Cycle life | 900 cycles or more | 350 cycles | 320 cycles |

As is obvious from Table 1, the module battery according to Example 1 of the present invention has a discharge capacity of 98 Ah which is 98% of the discharge capacity of the cell having a discharge capacity of 100 Ah. In contrast, the module batteries of the Comparative Examples 1 and 2 have the corresponding figures of 82 Ah and 77 Ah respectively, which are not more than 75 to 85% of the cell discharge capacity of 100 Ah.

Table 1 shows the discharge capacity and the temperature of the electrodes at the end of charging operation of the cells 1 to 5 making up the module battery. The number is attached to each cell in the order of stacking. The cells 1 and 5 are arranged at the ends and the cell 3 in the center of the module battery. The cells 1 through 5 configuring the module battery in accordance with the present invention display a similar discharge capacity and coincide with the characteristics of the module battery. This is in view of the fact that the heat generated by the electrodes of each cell at the time of charging is dissipated sufficiently and uniformly by the air flowing upward between the cells so that the cell temperature increase is limited within 15° C. above the environmental temperature.

More specifically, the reason for securing a superior discharge capacity of Example 1, as shown in Table 1, is that the temperature in the battery at the time of charging each cell making up the module battery is constant at 35° C. and that each cell is charged uniformly and sufficiently under the temperature conditions not deteriorating the charging efficiency of the nickel positive electrode of each cell. Also, as shown in Table 2, the module battery of Example 2 in accordance with the present invention has a superior cycle life characteristic without any decrease in discharge capacity even after 900 cycles of charging and discharging operations.

The module battery in accordance with Comparative Example 1 has cells with a casing having no recesses or protrusions on the outer surface thereof and has an inter-cell space of 3 mm allowing air passage. The casings of adjacent cells, however, are not in contact with each other. As shown in Table 1, the discharge capacity of the module battery of Comparative Example 1 is 82 Ah which is smaller than that of the module battery in accordance with the present the invention. This is for the reason that when the casing is deformed by the increase in the battery internal pressure or expansion of the electrodes at the time of charging, the omission of ribs, which otherwise might be required to hold the distances between adjacent cells, causes the inter-cell space width to change with the casing deformation, thereby making the air flow vary. As a result, even when air is supplied between the cells, heat hardly dissipates. Especially, the temperature of the cells situated at the center of the module battery rises considerably due to the heat of the adjacent cells. Also, the discharge capacity of the cells becomes non-uniform and ranges from 80 to 85 Ah.

Further, as shown in Table 2, the capacity of the module battery under consideration declines to only 50% of the initial discharge capacity after 350 cycles. This is probably due to the fact that the casing deformation is aggravated by repetitive charging and discharging operations and the resulting significant decrease in space width reduces the heat dissipation effect of ventilation. The battery temperature thus rises to deteriorate the performance of the negative electrode and reduce the discharge capacity.

In the module battery according to Comparative Example 2, by contrast, the end cells are configured to be held toward the center of the cell assembly by the end plates and the binding members. Therefore, at the time of charging, the casing deformation due to an increased battery internal pressure or the expansion of the electrodes cannot be suppressed, resulting in a most significant expansion of the electrodes. For this reason, the contact area between the foamed nickel porous substrate or punched metal making up the positive or negative electrode core and the positive or negative active material is reduced for a reduced conductivity. With the decrease in the conductivity of the positive and negative electrode plates, the charging efficiency of the cells decreases, thereby to increase the amount of heat generated at the time of charging. As shown in Table 1, the temperature at the end of charging of the cells making up the module battery in Comparative Example 2 is 50° to 54° C., which is 15° to 19° C. higher than that for the module battery of Example 1. The discharge capacity is 76 to 81 Ah, which is lower than that of Example 1.

Also, as seen from Table 2, this module battery shows at highest only 50% of the initial discharge capacity after 320 cycles. This is considered due to the fact that repetitive charging and discharging operations expand the electrode group and hence reduce the conductivity of the positive and negative electrode plates, with the result that the charging efficiency is reduced and the battery temperature rises. The performance of the negative electrode is deteriorated to reduce the discharge capacity.

According to the above-mentioned embodiment, the module battery includes five cells. Apart from this, 5 to 40 cells for each module battery is appropriate when considering the battery management, maintenance, replacement or portability of a pack battery.

Various battery casings have been prepared with various dimensions and elastic modulus thereof to fabricate a cell and a module battery configured of five cells similar to those in Example 1.

EXAMPLE 2

Battery casings with rib heights of 0.5 mm, 1 mm, 2 mm and 3 mm respectively as shown in Table 3 were prepared with the outer dimensions thereof fixed. Using these battery casings, a cell and a module battery similar to those in Example 1 were prepared. The result of a discharge capacity test and a cycle life test is shown in Table 3.

TABLE 3

| No. | Rib height (mm) | Discharge capacity (Ah) | Cycle life |
| --- | --- | --- | --- |
| 1 | 0.5 | 88 | 310 cycles |
| 2 | 1 | 98 | 900 cycles |
| 3 | 2 | 98 | 900 cycles |
| 4 | 3 | 90 | 720 cycles |

EXAMPLE 3

As shown in Table 4, battery casings were prepared in a manner similar to those in Example 1 except that the rib intervals were 5 mm, 10 mm, 15 mm or 20 mm. A cell and a module battery were prepared with such ribs. The result of a cycle life test and a discharge capacity test is shown in Table 4.

TABLE 4

| No. | Rib interval (mm) | Discharge capacity (Ah) | Cycle life |
| --- | --- | --- | --- |
| 5 | 5 | 85 | 380 cycles |
| 6 | 10 | 98 | 900 cycles |
| 7 | 15 | 98 | 900 cycles |
| 8 | 20 | 88 | 410 cycles |

EXAMPLE 4

As shown in Table 5, battery casings were prepared in a manner similar to those in Example 1 except that the rib width varied between 1 mm, 3 mm, 10 mm and 15 mm. A cell and a module battery were prepared using these rib forms. The result of a discharge capacity test and a cycle life test is shown in Table 5.

TABLE 5

| No. | Rib width (mm) | Discharge capacity (Ah) | Cycle life |
| --- | --- | --- | --- |
| 9 | 1 | 98 | 350 cycles |

TABLE 5-continued

| No. | Rib width (mm) | Discharge capacity (Ah) | Cycle life |
| --- | --- | --- | --- |
| 10 | 3 | 98 | 900 cycles |
| 11 | 10 | 98 | 900 cycles |
| 12 | 15 | 85 | 380 cycles |

EXAMPLE 5

As seen from Table 6, battery casings were prepared in a manner similar to those in Example 1 except that the thickness of the battery casing not including the ribs varied between 0.5 mm, 1 mm, 3 mm and 5 mm, and a cell and a module battery were obtained using these configurations. The result of a discharge capacity test and a cycle life test is shown in Table 6.

TABLE 6

| No. | Thickness of side wall 18 of casing (mm) | Discharge capacity (Ah) | Cycle life |
| --- | --- | --- | --- |
| 13 | 0.5 | 85 | 380 cycles |
| 14 | 1 | 98 | 900 cycles |
| 15 | 3 | 98 | 900 cycles |
| 16 | 5 | 88 | 400 cycles |

EXAMPLE 6

As shown in Table 7, battery casings were prepared in a manner similar to those in Example 1 except that the thickness of the narrow side wall 19 of the casing different from the direction of stacking varied between 1 mm, 3 mm, 5 mm and 7 mm. A cell and a module battery were prepared using these configurations. The result of a discharge capacity test and a cycle life test is shown in Table 7.

TABLE 7

| No. | Thickness of side wall 19 of casing (mm) | Discharge capacity (Ah) | Cycle life |
| --- | --- | --- | --- |
| 17 | 1 | 98 | 110 cycles |
| 18 | 3 | 98 | 900 cycles |
| 19 | 5 | 98 | 900 cycles |
| 20 | 7 | 94 | 620 cycles |

EXAMPLE 7

As shown in Table 8, battery casings were prepared in a manner similar to those in Example 1 except that the bending elastic modulus of the casing material varied between 10,000 kg/cm$^2$, 14,000 kg/cm$^2$, 28 000 kg/cm$^2$ and 32,000 kg/cm$^2$ (according to the test method of ASTM, D-790). A cell and a module battery were prepared using these configurations. The result of a discharge capacity test and a cycle life test is shown in Table 8.

TABLE 8

| No. | Bending elastic modulus of casing (kg/cm$^2$) | Discharge capacity (Ah) | Cycle life |
| --- | --- | --- | --- |
| 21 | 10000 | 88 | 350 cycles |
| 22 | 14000 | 98 | 900 cycles |

TABLE 8-continued

| No. | Bending elastic modulus of casing (kg/cm$^2$) | Discharge capacity (Ah) | Cycle life |
| --- | --- | --- | --- |
| 23 | 28000 | 98 | 900 cycles |
| 24 | 32000 | 98 | 180 cycles |

According to Example 2 as shown in Table 3, the battery No. 1 having a battery casing 0.5 mm in rib height has a low discharge capacity of 88 Ah and a short cycle life. This is for the reason that the space area width for allowing air passage formed by butted ribs between cells is so small that the air flow velocity of only about 0 to 0.1 m/s is obtained in the space portion at the start of charging due to pressure loss, and the heat transmitted to the casing surface fails to discharge thereby to increase the temperature at the end of charging the cell. Increasing the fan capacity as a means for increasing the air flow velocity in the space portion is not desirable as it would increase the power consumption of the fan. When the rib height is increased to 3 mm as in the battery No. 4, on the other hand, it was confirmed that the discharge capacity and the cycle life are deteriorated. This is by reason of the fact that an increased space area allowing air passage reduces the air flow velocity in the space, with the result that the flow changes to a laminar flow while at the same time reducing the heat dissipation efficiency. Also, since the outer dimensions of the battery casing remain the same, the resulting reduction in the space for the electrode group is undesirable from the viewpoint of volume energy density. These facts indicate that an appropriate rib height is from 1 mm to 2 mm.

According to Example 3, as seen from Table 4, the ribs 5 mm apart of the battery No. 5 occupy so large a proportion of the casing surface area that the resulting reduced area allowing air flow makes it difficult to dissipate the heat generated in the electrode group. The discharge capacity thus decreases to 85 Ah thereby to reduce the cycle life. In the battery No. 8 having a rib interval of 20 mm, the interval between casings due to butted ribs is large as compared with the battery internal pressure, and therefore the casing is deformed with heat insulating layer of air formed between the electrode group and the casing. Also, the reduced space area allowing air passage between cells makes it difficult to dissipate the heat generated in the electrode group. The discharge capacity thus decreases to 88 Ah thereby shortening the cycle life. In view of this, the interval between protruded ribs is desirably from 10 mm to 15 mm.

In Example 4, as seen from Table 5, the 15-mm-wide ribs of the battery No. 12 occupy so large a proportion of the area of the casing surface that the area allowing air flow is reduced. The heat generated in the electrode group is hard to dissipate, with the result that the discharge capacity is reduced to 85 Ah for a shortened cycle life. With the battery No. 9 having a rib width of 1 mm, on the other hand, the discharge capacity begins to fall sharply after 120 cycles, and the discharge capacity after 350 cycles is only 50% of the initial figure. This is due to the fact that the butted portions of the ribs are broken by the expansion of the electrode group and the resulting displacement leads to the loss of the binding effect which otherwise could be secured by the end plates and the binding members. This fact shows that the desirable width of the protruded ribs is from 3 mm to 10

According to Example 5 as shown in Table 6, the battery No. 13 has a casing thickness of 0.5 mm. Due to this small thickness as compared with the battery internal pressure, the casing is deformed, a heat insulating layer of air is formed between the electrode group and the casing, and the air space area allowing the air to pass between cells is reduced in width. Consequently, the heat generated in the electrode group is difficult to dissipate, so that the discharge capacity falls to 85 Ah for a shortened cycle life. With regard to the battery No. 16 having a casing thickness of 5 mm, on the other hand, the thick casing thickness makes it difficult to dissipate the heat generated in the electrode group and the discharge capacity falls to 88 Ah, thereby reducing the cycle life. All of these facts indicate that the casing thickness of from 1 mm to 3 mm is preferable.

Referring to Example 6, as obvious from Table 7, the battery No. 17 having a side wall thickness of the casing of 1.0 mm has a short life of 110 cycles. This is because the strength of the side wall of the casing is insufficient to accommodate the rise in the battery internal pressure and a cracking occurs at a stress-concentrated portion in about 100 cycles leading to the leakage of the electrolyte. This is also the case with the thickness of the bottom of the casing and the lid. With the battery No. 20 having a side wall thickness of the casing of 7.0 mm, however, the discharge capacity falls as the decrease in heat dissipation from the side walls of the casing thereby to shorten the cycle life thereof. From the viewpoint of volumetric energy density, the thickness of the side wall of the casing and bottom is desirably from 3 mm to 5 mm. Further, the casing bottom is preferably formed with reinforcing protrusions or recesses.

Referring to Example 7, as seen from Table 8, the battery No. 21 has a casing made of a low-density polyethylene 10,000 kg/cm$^2$ in bending elastic modulus. The casing of this battery is deformed due to a small rigidity thereof against the battery internal pressure, and a heat insulating layer of air is formed between the electrode plates and the casing. Also, the small space width between cells allowing air flow makes it difficult to dissipate the heat generated by the electrodes. As a consequence, the discharge capacity fails to 88 Ah and the cycle life is shortened. As for the battery No. 24 made of ABS resin with a bending elastic modulus of 32,000 kg/cm$^2$ on the other hand the cycle life is as short as 180 cycles. This is in view of the fact that a material having a low bending elastic modulus is generally low in fragility. Especially, the thermally welded portion between the casing and the lid becomes so fragile that the expansion of the electrode plates causes a cracking thereby leading to the leakage of the electrolyte. Considering the above-mentioned fact, an appropriate bending elastic modulus is from 14,000 kg/cm$^2$ to 28,000 kg/cm$^2$.

According to this embodiment, polypropylene is used as a rigid resin having a bending elastic modulus of from 14,000 kg/cm$^2$ to 28,000 kg/cm$^2$. It is possible, however, to use denatured polyphenylene ether, polyamide or an alloy of one of them with polypropylene alternatively.

EXAMPLE 8

A module battery was configured using ten cells as in Example 1.

Comparative Example 3

A cell was formed using a battery casing having no positioning protrusion or recess on the rib surface. A module battery was configured using ten such cells as in Example 1.

Comparative Example 4

A cell was prepared by a battery casing having no recess 22 for positioning the binding member 34 on the side wall of the battery casing. A module battery was prepared using ten such cells as in Example 1.

A vibration test was conducted on the module batteries in accordance with Example 8 and Comparative Examples 3 and 4. The vibration conditions are such that each module battery was vibrated for 6 hours at an acceleration of 5G in vertical, lateral and longitudinal directions respectively to observe the appearance change of the module battery. The result is shown in Table 9.

TABLE 9

| | Results of vibration test |
|---|---|
| Example 1 | No change |
| Comparative Example 3 | Misalignment occurred between cells (two per 10) |
| Comparative Example 10 | Misalignment occurred between cell and end plate (8 per 10) |

None of the module batteries in accordance with Example 8 of the present invention changed in outer appearance as a result of the vibration test. In the module battery in accordance with Comparative Example 3 having no positioning protrusion or recess in the rib surface, a misalignment of the butted ribs of two out of the ten cells was observed.

In view of the above-mentioned fact, in order to prevent misalignment of the ribs in butted relation, it is effective to provide a positioning protrusion or recess in the ribs. Also, in the module batteries in accordance with Comparative Example 4 lacking recesses for positioning the binding members in the side wall of the casing in contact with the binding members, two out of the ten unit cells were observed to have the binding members, end plates and the battery casing in misalignment. In order to secure the binding members, end plates and the battery casing in position, it is effective to form a positioning recess in the side wall of the battery casing in contact with the binding member.

EXAMPLE 9

A module battery was prepared in a manner similar to that in Example 1.

Comparative Example 5

A module battery was prepared in a manner similar to that in Example 1 except that an end plate 33 of polypropylene was used.

Comparative Example 6

A module battery was prepared in a manner similar to that in Example 1 except that the end plate was made of copper.

A discharge capacity test and a cycle life test were conducted on the module batteries in accordance with Example 1 and Comparative Examples 5 and 6. The test result and a comparison of specific energy are shown in Table 10.

TABLE 10

| | Example 1 | Comparative Example 5 | Comparative Example 6 |
|---|---|---|---|
| Material | Aluminum | Polypropylene | Copper |
| Discharge capacity (Ah) | 98 | 83 | 98 |
| Cycle life | 900 cycles or more | 450 cycles | 900 cycles or more |
| Specific energy (wh/kg) | 72 | 63 | 65 |

As seen from Table 10, in the case where the end plates are made of polypropylene as in Comparative Example 5, the insufficient rigidity of the end plates makes it impossible to suppress the casing expansion against the rise in the battery internal pressure, and heat dissipation is prevented by the air space generated between the electrode group and the casing. Also, since the heat conductivity of the polypropylene end plate is smaller than that of aluminum, heat dissipation from the end cells of the module battery in particular is restricted. As a result, the discharge capacity and the cycle life of the module battery according to Comparative Example 5 are reduced as compared with those of the module battery of Example 1. The module battery in accordance with Comparative Example 6 having end plates made of copper, which has a performance equivalent to Example 1 in both discharge capacity and cycle life, includes a heavier end plate and is not desirable from the viewpoint of the weight energy density.

In view of the above-mentioned facts, the end plates desirably have a light weight and a sufficient strength not to cause any deformation within the framework of limited dimensions with the rise in battery internal pressure. Further, the end plates desirably are made of a main material of aluminum superior in thermal conductivity. Also, apart from the prismatic structure of the binding members used in the above-mentioned Examples, a similar effect is obtained by a band or a cylindrical shape.

EXAMPLE 10

A module battery was configured in a manner similar to that in Example 1.

Comparative Example 7

A module battery was configured in a manner similar to that in Example 1 except that the end plates were configured of a flat aluminum plate 3 mm in thickness without ribs.

Comparative Example 8

A module battery was configured in a manner similar to that in Example 1 except that end plates of a flat aluminum plate 10 mm thick were used without ribs. Table 11 shows the result of a cycle life test and a discharge capacity test conducted on module batteries according to Example 1 and Comparative Examples 7 and 8 and a comparison of specific energy.

TABLE 11

| | Example 1 | Comparative Example 7 | Comparative Example 8 |
|---|---|---|---|
| Thickness (mm) | 3 | 3 | 10 |
| Presence of rib | yes | no | no |
| Discharge | 98 | 85 | 94 |

TABLE 11-continued

|  | Example 1 | Comparative Example 7 | Comparative Example 8 |
|---|---|---|---|
| capacity (Ah) | | | |
| Cycle life | 900 cycles or more | 380 cycles | 800 cycles |
| Specific energy (wh/kg) | 72 | 66 | 65 |

As seen from Table 11, the module battery in accordance with Comparative Example 7 using an aluminum flat plate 3 mm thick without ribs of the end plates cannot suppress the expansion of the battery casing for lack of the strength of the end plates against the increase in the battery internal pressure, and heat dissipation is prevented by the space formed between the electrode group and the battery casing. The result is a higher battery internal temperature, and a reduced discharge capacity and cycle life as compared with the module battery in accordance with Example 1. Also, a module battery in accordance with Comparative Example 8 lacking the ribs of the end plates and made of a flat aluminum plate 10 mm thick, although the expansion of the casing with the rise in the battery internal temperature is suppressed, has an increased thickness of the end plates as compared with the module battery in accordance with Example 1. The resulting reduction in surface area reduces the heat dissipation from the cells at the ends of the module battery. Consequently, the discharge capacity is reduced to 94 Ah and the cycle life to 800 cycles. Further, the increased weight of the end plate is disadvantageous from the viewpoint of weight energy density.

In view of the above-mentioned facts, at least two ribs are preferably formed on the end plates for improving reinforcement and heat dissipation and reducing the weight.

The ribs, which are formed in longitudinal direction in the above-mentioned embodiment, may alternatively be formed in lateral direction on the surface of the battery casing.

The operating pressure of the safety vent is preferably from 2 kg/cm$^2$ to 8 kg/cm$^2$ considering the strength of the battery casing and the weld zone between the casing and the lid. In the case where the operating pressure of the safety vent increases beyond 8 kg/cm$^2$, the battery casing or the weld zone between the casing and the lid breaks down. Also, it would be difficult to control the battery internal pressure below 2 kg/cm$^2$ even against the charging rate at 0.1 C. As a result, the operating pressure of the safety vent is desirably from 2 kg/cm$^2$ to 8 kg/cm$^2$ from the viewpoint of the battery performance and the reliability of the battery casing.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A cell of a sealed alkaline storage battery comprising:

a battery casing of a synthetic resin, an alkaline electrolyte and an electrode group accommodated in said battery casing, and a lid with a safety vent sealingly fitted to the opening of said battery casing;

wherein said battery casing has a plurality of ribs in parallel with each other on outer surfaces thereof, a thickness of side walls of said casing having said ribs is from 1 mm to 3 mm, a rib height is from 1 mm to 2 mm, an interval between said ribs is from 10 mm to 15 mm, and a rib width is from 3 mm to 10 mm.

2. The cell in accordance with claim 1, wherein a thickness of side walls (19) of said casing without ribs is from 3 mm to 5 mm and a thickness of said lid (13) is from 3 mm to 5 mm.

3. The cell in accordance with claim 1, wherein the material making up said battery casing is a synthetic resin from 14,000 kg/cm$^2$ to 28,000 kg/cm$^2$ in bending elastic modulus.

4. The cell in accordance with claim 1, wherein at least one of said ribs has a protrusion (23) on its surface and another one has a recess (24) on its surface, for defining relative positions of cells.

5. The cell in accordance with claim 1, wherein said ribs (21) (30) are formed continuously in longitudinal or lateral direction of said battery casing.

6. The cell in accordance with claim 1, wherein positive electrode plates of said electrode group are nickel electrodes including nickel hydroxide as an active material, and negative electrode plates thereof are made of, as a main component, a hydrogen storage alloy which electrochemically absorbs and desorbs hydrogen.

7. A module battery (31) comprising a plurality of cells (10) stacked in one direction forming a stacked assembly, each of said cells comprising a battery casing (12) of a synthetic resin, an alkaline electrolyte and an electrode group (11) accommodated in said battery casing, and a lid (13) with a safety vent (16) sealingly fitted to the opening of said battery casing; wherein said cells are bound in a direction of stacking of cells by binding members (34) connecting end plates (33) to each other provided on both ends in said stacked assembly, spaces (36) for allowing air flow between said cells are formed by a plurality of parallel ribs (21) (30) formed in butted relation with each other on the outer surfaces of said battery casing in the direction of stacking, and a thickness of side walls (18) of said battery casing along the direction of stacking is from 1 mm to 3 mm, a rib height from 1 mm to 2 mm, a rib interval from 10 mm to 15 mm, and a rib width from 3 mm to 10 mm.

8. The module battery in accordance with claim 7, wherein a thickness of the other side walls (19) of said battery casing is from 3 mm to 5 mm and a thickness of said lid is from 3 mm to 5 mm.

9. The module battery in accordance with claim 7, wherein recesses (22) are formed for positioning said binding members (34) on the side walls of said battery casing.

10. The module battery in accordance with claim 7, wherein adjacent cells are positioned relatively to each other by at least two positioning members including a recess (24) on the rib surface of one battery casing and a protrusion (23) on the rib surface of the other battery casing fitted to each other.

11. The module battery in accordance with claim 7, wherein positive and negative electrode plates of said electrode group are laminated along the direction of stacking of the cells through a separator, and said electrode group is at least partially in contact with the inner surface of the battery casing.

12. The module battery in accordance with claim 7, wherein the operating pressure of said safety vent is from 2 kg/cm$^2$ to 8 kg/cm$^2$.

13. The module battery in accordance with claim 7, wherein positive electrode plates of said electrode group are nickel electrodes made of nickel hydroxide as an active material, and negative electrode plates are made of, as a main component, a hydrogen storage alloy which electrochemically absorbs and desorbs hydrogen.

14. A battery casing of a synthetic resin for configuring a module battery by stacking a plurality of cells in one direction, wherein a plurality of parallel ribs in butted relation with an adjacent battery casing are formed on the outer surfaces of side walls of said casing along the direction of stacking, a thickness of said side walls along the direction of stacking is from 1 mm to 3 mm and a thickness of the other casing side walls from 3 mm to 5 mm.

15. The module battery in accordance with claim 8, wherein positive and negative electrode plates of said electrode group are laminated along the direction of stacking of the cells through a separator, and said electrode group is at least partially in contact with the inner surface of the battery casing.

16. The module battery in accordance with claim 9, wherein positive and negative electrode plates of said electrode group are laminated along the direction of stacking of the cells through a separator, and said electrode group is at least partially in contact with the inner surface of the battery casing.

17. The module battery in accordance with claim 10, wherein positive and negative electrode plates of said electrode group are laminated along the direction of stacking of the cells through a separator, and said electrode group is at least partially in contact with the inner surface of the battery casing.

18. A module battery of sealed alkaline storage battery in accordance with claim 8, wherein the operating pressure of said safety vent is from 2 $kg/cm^2$ to 8 $kg/cm^2$.

19. The module battery in accordance with claim 9, wherein the operating pressure of said safety vent is from 2 $kg/cm^2$ to 8 $kg/cm^2$.

20. The module battery in accordance with claim 10, wherein the operating pressure of said safety vent is from 2 $kg/cm^2$ to 8 $kg/cm^2$.

21. The module battery in accordance with claim 8, wherein positive electrode plates of said electrode group are nickel electrodes made of nickel hydroxide as an active material, and negative electrode plates are made of, as a main component, a hydrogen storage alloy which electrochemically absorbs and desorbs hydrogen.

22. The module battery in accordance with claim 9, wherein positive electrode plates of said electrode group are nickel electrodes made of nickel hydroxide as an active material, and negative electrode plates are made of, as a main component, a hydrogen storage alloy which electrochemically absorbs and desorbs hydrogen.

23. The module battery in accordance with claim 10, wherein positive electrode plates of said electrode group are nickel electrodes made of nickel hydroxide as an active material, and negative electrode plates are made of, as a main component, a hydrogen storage alloy which electrochemically absorbs and desorbs hydrogen.

* * * * *